US007226720B2

(12) United States Patent
Wisnudel et al.

(10) Patent No.: US 7,226,720 B2
(45) Date of Patent: *Jun. 5, 2007

(54) LIMITED PLAY DATA STORAGE MEDIA AND METHOD FOR LIMITING ACCESS TO DATA THEREON

(75) Inventors: Marc Brian Wisnudel, Clifton Park, NY (US); Kathryn Lynn Longley, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 495 days.

This patent is subject to a terminal disclaimer.

(21) Appl. No.: 10/657,667

(22) Filed: Sep. 8, 2003

(65) Prior Publication Data

US 2005/0053865 A1 Mar. 10, 2005

(51) Int. Cl.
 *G11B 7/24* (2006.01)
(52) U.S. Cl. ............... 430/270.11; 430/945; 428/64.8; 720/719; 369/288
(58) Field of Classification Search ............ None
See application file for complete search history.

(56) References Cited

U.S. PATENT DOCUMENTS

| 3,635,895 | A | 1/1972 | Kramer |
| 3,697,395 | A | 10/1972 | Kehr et al. |
| 3,697,402 | A | 10/1972 | Kehr et al. |
| 4,001,184 | A | 1/1977 | Scott |
| 4,179,548 | A | 12/1979 | Schroeter et al. |
| 4,217,438 | A | 8/1980 | Brunelle et al. |
| 4,404,257 | A | 9/1983 | Olson |
| 4,491,508 | A | 1/1985 | Olson et al. |
| 5,815,484 | A | 9/1998 | Smith et al. |
| 6,011,772 | A | 1/2000 | Rollhaus et al. |
| 6,338,933 | B1 | 1/2002 | Lawandy et al. |
| 6,343,063 | B1 | 1/2002 | Rollhaus et al. |
| 6,866,909 | B2 * | 3/2005 | Wisnudel et al. ........ 428/64.1 |
| 2003/0002431 | A1 | 1/2003 | Breitung et al. |
| 2003/0198892 | A1* | 10/2003 | Ezbiansky et al. ..... 430/270.14 |
| 2003/0207206 | A1* | 11/2003 | Olson et al. .......... 430/270.14 |
| 2004/0152013 | A1* | 8/2004 | Olson et al. .......... 430/270.11 |

FOREIGN PATENT DOCUMENTS

JP 01-290137 * 11/1989

OTHER PUBLICATIONS

Encyclopedia of Polymer Science and Technology, vol. 1, Interscience Publishers, John Wiley & Sons, Inc., 246-328 (1964) and references cited therein.
Pauly, S., "Permeability and Diffusion Data," Encyclopedia of Polymer Science vol. VI, 563-569.
PCT Search Report—Dec. 15, 2004.

* cited by examiner

*Primary Examiner*—Martin Angebranndt
(74) *Attorney, Agent, or Firm*—Carter, DeLuca, Farrell & Schmidt, LLP

(57) ABSTRACT

A limited play optical storage medium for data is described which comprises a first substrate, a reflective layer, a data layer disposed between said substrate and said reflective layer; a reactive layer comprising at least one carrier, and at least one reactive material, and an optically transparent second substrate comprised of a polymethacrylate copolymer or blend comprising a polymethacrylate copolymer or homopolymer. The second substrate is disposed between the reactive layer and a laser incident surface and is tailored to provide an oxygen permeability in a range between about 0.1 Barrers and about 1.35 Barrers at 25° C.

25 Claims, 1 Drawing Sheet

LIMITED PLAY DATA STORAGE MEDIA AND METHOD FOR LIMITING ACCESS TO DATA THEREON

RELATED APPLICATION

The present invention is allied with co-pending U.S. patent application Ser. No. 10/657,631 filed on Sep. 8, 2003 which is incorporated herein by reference in its entirety.

BACKGROUND OF THE INVENTION

The present invention is related to optical data storage media. More particularly, the present invention is related to limited play optical data storage media.

Optical, magnetic and magneto-optic media are primary sources of high performance storage technology, which enable high storage capacity coupled with a reasonable price per megabyte of data stored. The use of optical media has become widespread in audio, video, and computer data storage applications in such formats as compact disc (CD), digital versatile disc (DVD, including multi-layer structures like DVD-5, DVD-9 and multi-sided formats such as DVD-10, and DVD-18), magneto-optical disc (MO), and other write-once and re-writable formats such as CD-R, CD-RW, DVD-R, DVD-RW, DVD+RW, DVD-RAM, and the like, hereinafter collectively "data storage media". In these formats, data are encoded onto a substrate into a digital data series. In pre-recorded optical media, such as CD, the data are typically pits and grooves embossed on the surface of a plastic substrate using a method such as injection molding, stamping or the like.

In recordable media, the data are encoded by laser, which illuminates an active data layer that undergoes a phase change, thus producing a series of highly reflecting or non-reflecting regions making up the data stream. In these formats, a laser beam first travels through a plastic substrate before reaching the data layer. At the data layer, the beam is either reflected or not, in accordance with the encoded data. The laser light then travels back through the plastic and into an optical detector system where the data are interpreted.

In some applications, it is desirable to limit the playable lifetime of an optical disc. For example, there is widespread interest in providing temporary access to music, movies, and other forms of digital entertainment without requiring a purchaser to return a data storage device to its provider. Put in very concrete terms, a customer purchasing a movie on a limited play DVD would be granted only limited access to the movie because by design, access to the data contained within the limited play DVD would be extinguished over a relatively short period of time after its first use. Another example is sample computer programs that are provided to potential customers in order to entice them to purchase the software. The programs are intended to be used for a limited period of time. In each of these applications and others, when that time has expired, the disc must be returned. Recycling concerns raised by such limited use schemes are balanced by the both recyclability of the limited play DVD itself and the elimination of at least one trip, typically in an automobile, to the site of the DVD's purchase.

Thus, a need exists for machine-readable optical discs which provide limited access to music, movies, other forms of digital entertainment, or any other data for which limited access is appropriate, wherein said optical discs do not need to be returned to the provider at the end of a limited period of access. Limited-play optical discs provide a solution to this problem.

Limited play discs such as DVD's have been produced by various methods. One method includes forming a disc comprising a reflective layer protected by a porous barrier layer such that the reflective layer becomes oxidized over a pre-determined period of time. Once the reflective layer attains a certain level of oxidation, the disc is no longer readable. Hence the time taken for the passage of oxygen through the substrate layer becomes very vital for the play-time of the limited play disks. Moreover, where the limited period of access is predicated on oxygen sensitivity of the DVD alone, steps must be taken such that the substrate possess the necessary level of oxygen permeability such that the oxygen does not reach the reactive layer before the pre-determined time, enabling the DVD remains fully playable during the limited period of access.

In view of the forgoing, there exists a need to protect the limited play data storage media from uncontrolled abridgement of the useful lifespan of the data storage media. The present invention provides novel solutions to these and allied problems as evidenced by the description, examples and claims that follow.

BRIEF SUMMARY OF THE INVENTION

The present invention provides a limited play optical storage medium for data, comprising:
 a. a first substrate;
 b. a reflective layer;
 c. a data layer disposed between said substrate and said reflective layer;
 d. a reactive layer comprising at least one carrier; and at least one reactive material; and
 e. an optically transparent second substrate with an oxygen permeability in a range between about 0.1 Barrers and about 1.35 Barrers at 25° C. wherein the second substrate is disposed between the reactive layer and a laser incident surface, wherein the second substrate comprise a polymethacrylate copolymer, or a blend comprising a polymethacrylate homopolymer or copolymer.

DETAILED DESCRIPTION OF THE INVENTION

Figure 1:
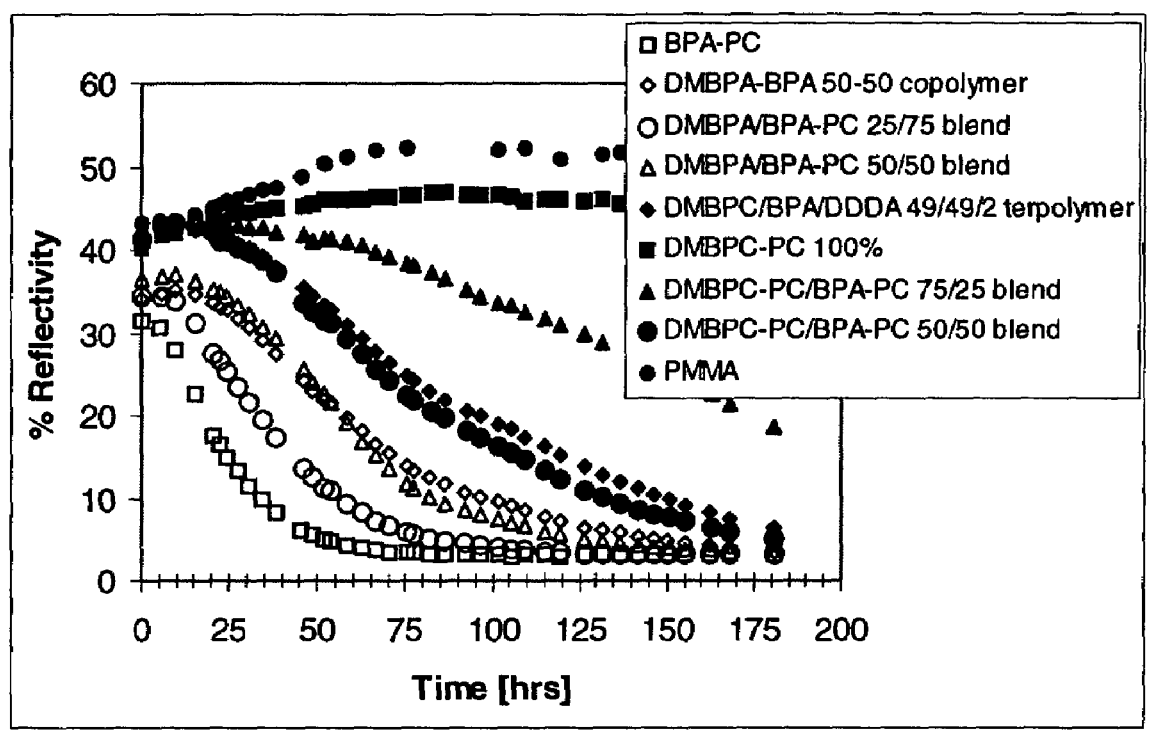
FIG. 1 depicts the change in reflectivity over time of a series of limited play DVD's each having a different material constituting the second substrate layer of the DVD.

In this specification and in the claims that follow, reference will be made to a number of terms that shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

"Play-time" is defined as the total time in which the limited-play data storage medium plays generally without error in the playback device.

As used herein the term "DMBPC" is defined as 1,1-bis (4-hydroxy-3-methylphenyl)cyclohexane.

As used herein the term "DMBPA" is defined as dimethylbisphenol A, 2,2-bis(4-hydroxy-3-methylphenyl)propane.

As used herein the term "DDDA" is defined as dodecandioic acid.

The data storage medium according to the present invention comprises a first substrate; a reflective layer; a data layer; a reactive layer; and a second substrate. The data storage medium may further comprise a light-absorbing layer and an adhesive layer. In one embodiment the data layer is disposed between the first substrate and the reflective layer. It is desirable that the plastic employed for both the first substrate and second substrate to have sufficient thermal and mechanical stability to prevent deformation during the various layer deposition steps as well as during storage by the end-user. That is, the plastic should be capable of withstanding subsequent processing parameters for example while the subsequent layers are applied, such as sputtering temperatures from about room temperature (about 25° C.) up to about 150° C., and subsequent storage conditions for example in a hot car having temperatures of about 70° C. In one embodiment of the present invention the first substrate and second substrate may comprise thermoplastics with glass transition temperatures of about 100° C. or greater.

Examples of materials suitable for use in the first substrate and second substrate include, but are not limited to, amorphous, crystalline, and semi-crystalline thermoplastic materials such as: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate (PMMA), methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and tetrafluoroethylenes (e.g., Teflons).

In one embodiment of the present invention the second substrate comprises at least one thermoplastic, and wherein the second substrate has an oxygen permeability in a range between about 0.1 Barrers and about 1.35 Barrers at 25° C., and even more preferably between 0.2 and 1.2 Barrers at 25° C. The permeability of bisphenol A polycarbonate is 1.39 Barrers. Because of its relatively high oxygen permeability bisphenol A polycarbonate is not well adapted for use as the second substrate since it is not suited for extending the playtime of limited play DVDs of the present invention. In one embodiment of the present invention, the second substrate is a polymethacrylate copolymer or a blend comprising a polymethacrylate homopolymer or copolymer. Poly (methyl methacrylate) homopolymer itself has a permeability of 0.116×1013 cm3.cm/(cm2.sec.Pa) which is equivalent to 0.154 Barrers at 34° C. (Encyclopedia of Polymer Science, vol VI, pg. 549). The homopolymer of polymethylmethacrylate is itself not very well suited for limited-play DVDs because the low oxygen permeability. However, in one embodiment of the present invention the methacrylate can be copolymerized with other monomers to produce polymethacrylate copolymer compositions possessing oxygen permeability within the desired range. In yet another embodiment the poly(methyl methacrylate) homopolymer can be blended with other polymers in order to produce blend compositions possessing oxygen permeability within the desired range. In still another embodiment polymethacrylate copolymers may be blended with another thermoplastic to produce blend compositions possessing oxygen permeability within the desired range.

Exemplary polyacrylates with an oxygen permeability in a range between about 0.1 Barrers and about 1.35 Barrers at 25° C. include polyacrylates comprising structural units corresponding to structures (I):

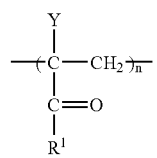

wherein Y is hydrogen, $C_1$–$C_{12}$ alkyl group, a $C_4$–$C_{10}$ aryl group, $R^1$ is $C_1$–$C_{12}$ alkoxy group, and n is an integer from 1 to 10000.

In another embodiment the second substrate includes at least one polymer comprising structural units corresponding to structure (II)

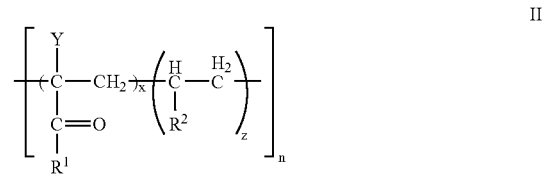

wherein Y is hydrogen, a $C_1$–$C_{12}$ alkyl group, a $C_4$–$C_{10}$ aryl group; $R^1$ is defined as in structure I; $R^2$ is $C_4$–$C_{10}$ aryl group, $C_1$–$C_{12}$ alkoxy group, cyano, nitro, or halogen; x and z are independently integers from 1–10000, and n is an integer from 1 to 10000. The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples $C_1$–$C_{32}$ alkyl optionally substituted with one or more groups selected from $C_1$–$C_{32}$ alkyl, $C_3$–$C_{15}$ cycloalkyl or aryl; and $C_3$–$C_{15}$ cycloalkyl optionally substituted with one or more groups selected from $C_1$–$C_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include $C_6$–$C_{15}$ aryl optionally substituted with one or more groups selected from $C_1$–$C_{32}$ alkyl, $C_3$–$C_{15}$ cycloalkyl or aryl. Some particular illustrative examples of aryl radicals comprise substituted or unsubstituted phenyl, biphenyl, toluyl and naphthyl.

The polymethacrylate copolymer used in the second substrate may be a random, alternate or block copolymer. In one embodiment of the present invention the polymethacrylate copolymer is a random copolymer. In one embodiment the second substrate is a copolymer of methyl methacrylate and styrene. In an alternate embodiment of the present invention, the second substrate comprises a polymethacrylate copolymer wherein from about 10 to about 90 mole % of the structural units are derived from methyl methacrylate. The polymethacrylate may be blended with other polymers with which it is miscible to obtain compositions possessing oxygen permeability tailored to meet the requirements of a particular limited play optical data storage medium, for example a limited play DVD.

In one embodiment of the present invention, the oxygen permeability of the second substrate may also be modified by the addition of small molecule additives blended into a polymethacrylate containing composition. Examples of small molecule additives include antiplasticizers, pigments, mold release agents, thermal stabilizers, ultraviolet absorbers, and mixtures thereof.

In some optical media formats, the thickness of the second substrate may be different from that thickness specified for DVD. For example, in the proposed Blue-ray video disk, the data layer is separated from air by a 100 micron film. In this case, the permeability of the film required would need to be lower to provide an adequate diffusion lag time. For example, a 100 micron thick polymethacrylate film with a permeability of 1.39 Barrers, the lag time is predicted to be 13 min. For a film with a permeability of 0.013 Barrers, the lag time is predicted to be 24 hrs. In one embodiment, the second substrate has a thickness in a range between about 0.5 mm and about 0.7 mm. In another embodiment of the present invention, the second substrate has a thickness in a range between about 0.05 millimeters (mm) and about 0.3 mm.

In one embodiment of the present invention the data storage medium comprises the second substrate having low birefringence and high light transmittance at the read laser wavelength, i.e., is readable in an optical media device. Typically, the read laser wavelength is in a range between about 390 nanometers and about 430 nanometers (blue and blue-violet lasers). Alternatively the read laser wavelength is in a range between about 630 nanometers and about 650 nanometers (red lasers). The second substrate comprises material having sufficient optical clarity, e.g., a birefringence of about±100 nm or less, to render the data storage material readable in a media device.

The play-time for a limited-play data storage medium has been found to be effectively extended through the use of an optically transparent substrate with an oxygen permeability in a range between about 0.1 Barrers and about 1.35 Barrers at 25° C. where 1 Barrer=$10^{-10}$ cm$^3$ (STP) ·cm/cm$^2$·s·cmHg. The optically transparent substrate is situated between the reactive layer and a laser incident surface and is referred to as the "second substrate". Upon exposure to oxygen, a reactive material, e.g., leuco methylene blue, which is essentially colorless, is oxidized to form an opaque or semi-opaque layer (e.g., the deep blue dye, methylene blue). Data storage media with the opaque/semi-opaque layer can no longer be played in media players. By adjusting the time it takes to turn opaque, the dye layer can be used to provide limited-play data storage media having the desired life for the given application. In the case in which the dye layer is initially separated from air by a second substrate with thickness of between 0.5 and 0.7 mm, the use of a substrate with an oxygen permeability in a range between about 0.1 Barrers and about 1.35 Barrers at 25° C. substantially extends the time in which the dye layer becomes opaque as compared to a data storage medium wherein a second substrate with an oxygen permeability of greater than about 1.35 Barrers is used.

The effectiveness of the second substrate, typically comprised of polymethacrylate, in extending the time in which the dye layer becomes opaque depends in part on the rate at which oxygen can diffuse through the second substrate into the reactive dye layer. Oxygen will begin to leak through the second substrate after a lag time (Crank, *The Mathematics of Diffusion*, 2$^{nd}$ ed., Oxford University Press, 1975) approximated by $$L^2/(6D) \tag{Eq 1}$$

where L is the thickness of the second substrate and D is the diffusion coefficient of oxygen in the second substrate. The diffusion coefficient, D, can be obtained from the permeability, P, and the solubility, S, which is typically about 6.69×10−3 [cc]/([cc][cmHg]) for oxygen in polymethacrylate (Encyclopedia of Polymer Science, vol VI, pg. 568) by D=P/S where D is in units of cm2/s. In the case in which the second substrate thickness is 0.6 mm and the second substrate material is polycarbonate with an oxygen permeability of 1.39 Barrers and diffusivity of 2.1×10−8 cm2/s, the lag time is about 8 hrs. However, if the diffusivity is reduced to 0.7×10−8 cm2/s, a permeability of about 0.47 Barrers assuming that solubility is unchanged, then the lag time becomes about 24 hrs.

In one embodiment the first substrate is polycarbonate. As used herein the term "polycarbonate" refers to polycarbonates incorporating structural units derived from one or more dihydroxy aromatic compounds and includes copolycarbonates and polyester carbonates having structural units of the formula (III):

(III)

in which at least about 60 percent of the total number of R$^3$ groups are aromatic organic radicals and the balance thereof are aliphatic, or alicyclic radicals. Preferably, R$^3$ is an aromatic organic radical and, more preferably, a radical of the formula (IV):

(IV)

wherein each of A$^1$ and A$^2$ is a monocyclic divalent aryl radical and Y$^1$ is a bridging radical having zero, one, or two atoms which separate A$^1$ from A$^2$. In an exemplary embodiment, one atom separates A$^1$ from A$^2$. Illustrative, non-limiting examples of radicals of this type are —O—, —S—, —S(O)—, —S(O$_2$)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate A$^1$ from A$^2$, with an illustrative example being biphenol. The bridging radical Y$^1$ can be a hydrocarbon group or a saturated hydrocarbon group, for example, methylene, cyclohexylidene or isopropylidene or a heteroatom such as —O— or —S—.

Polycarbonates can be produced by the reaction of dihydroxy compounds in which only one atom separates A$^1$ and A$^2$. As used herein, the term "dihydroxy compound" includes, for example, bisphenol compounds having the general formula (V) as follows:

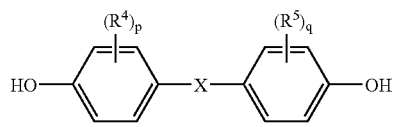

wherein R$^4$ and R$^5$ are independently at each occurrence a halogen atom, or a monovalent hydrocarbon group; p and q are each independently integers from 0 to 4; and X represents one of the groups of formula (VI):

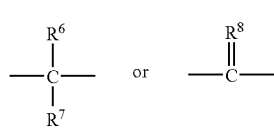

wherein R$^6$ and R$^7$ each independently represent a hydrogen atom or a monovalent linear or cyclic hydrocarbon group, and R$^8$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by formula (V) includes the following: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl) propane; 1,1-bis(4-hydroxyphenyl)butane; bis(4-hydroxyphenyl)phenylmethane; 2,2-bis(4-hydroxy-3-methylphenyl)propane (hereinafter "DMBPA"); 1,1-bis(4-hydroxy-t-butylphenyl) propane; bis(hydroxyaryl)alkanes such as 2,2-bis(4-hydroxy-3-bromophenyl)propane; 1,1-bis(4-hydroxyphenyl) cyclopentane; 4,4'-biphenol; bis(hydroxyaryl)cycloalkanes such as 1,1-bis(4-hydroxyphenyl)cyclohexane and 1,1-bis (4-hydroxy-3-methylphenyl)cyclohexane (hereinafter "DMBPC" or "BCC"); and the like. Additional examples of bisphenols suitable for use include fluorenone derived bisphenols such as 9,9'-bis(4-hydroxyphenyl)fluorene; and 9,9'-bis(4-hydroxy-3-methylphenyl)fluorene.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids possess between about 2 and about 40 carbon atoms A preferred aliphatic diacid is dodecandioic acid (DDDA).

Polyarylates, polyestercarbonate resins and blend comprising polyarylates or polyestercarbonate can also be employed. Branched polycarbonates are also useful, as well as blends of linear polycarbonates and branched polycarbonates. The branched polycarbonates may be prepared by adding a branching agent such as tris(4-hydroxyphenyl) ethane during polymerization.

Preferred polycarbonates are based on bisphenol A, in which each of A$^1$ and A$^2$ is p-phenylene and Y$^1$ is isopropylidene. Preferably, the weight average molecular weight of the polycarbonate is in a range between about 5,000 atomic mass units and about 100,000 atomic mass units, more preferably in a range between about 10,000 atomic mass units and about 65,000 atomic mass units, and most preferably in a range between about 15,000 atomic mass units and about 35,000 atomic mass units.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives.

The reflective layer should have a sufficient thickness to reflect a sufficient amount of energy such as light to enable data retrieval. Typically the reflective layer has a thickness of up to about 700 Å, with a thickness in a range between about 300 Å and about 600 Å generally preferred. Suitable reflective layers include any material capable of reflecting the particular wavelength of light being used to read the data comprised within the optical data storage medium. Reflective metals are particularly well suited for use as the reflective layer. Metals such as aluminum, silver, gold, silicon, titanium, and alloys and mixtures comprising at least one of the foregoing metals are generally well adapted for use as the reflective metal layer. In one embodiment of the present invention the reflective layer consists essentially of aluminum. In yet another embodiment of the present invention the reflective layer consists essentially of silver. In yet still another embodiment of the present invention the reflective layer consists essentially of gold.

In recordable media, the data are encoded by a laser, which illuminates an active data layer that undergoes a phase change, thus producing a series of highly-reflecting or non-reflective regions making up the data stream. In these formats, a laser beam first travels through the substrate before reaching the data layer. At the data layer, the beam is either reflected or not, in accordance with the encoded data. The laser light then travels back through the substrate and to an optical detector system where the data are interpreted. Thus, in one embodiment the data layer is disposed between the substrate and the reflective layer. The data layer for an optical application typically comprises pits, land, grooves, and combinations thereof on the substrate layer. Preferably, the data layer is embedded in the substrate surface. Typically, an injection molding-compression technique produces the substrate where a mold is filled with a molten polymer as defined herein. In one embodiment of the present invention the data layer is embossed upon a surface of the first substrate. The mold may contain a preform, insert, etc. The polymer system is cooled and, while still in at least partially molten state, compressed to imprint the desired surface features, for example, pits and land, arranged in spiral concentric or other orientation onto the desired portions of the substrate, i.e., one or both sides in the desired areas.

Possible data layers for magnetic or magneto-optic applications may comprise any material capable of storing retrievable data and examples include, but are not limited to, oxides (such as silicone oxide), rare earth elements—transition metal alloys, nickel, cobalt, chromium, tantalum, platinum, terbium, gadolinium, iron, boron, others, and alloys and combinations comprising at least one of the foregoing, organic dyes (e.g., cyanine or phthalocyanine type dyes), and inorganic phase change compounds (e.g., TeSeSn, InAgSb, and the like).

The reactive layer, typically comprises both a carrier and a reactive material. The reactive material can be included in the storage medium as a coating formulation or can be included in an adhesive formulation. In one embodiment the reactive material is an oxygen sensitive dye. In another embodiment of the present invention the possible reactive materials include oxygen sensitive leuco or reduced forms of methylene blue, brilliant cresyl blue, basic blue 3, and toluidine 0, as well as reaction products and combinations comprising at least one of the foregoing materials. In a preferred embodiment of the present invention the oxygen sensitive dye is leuco methylene blue. The structures of methylene blue dye VII and related dyes VII–X are shown below.

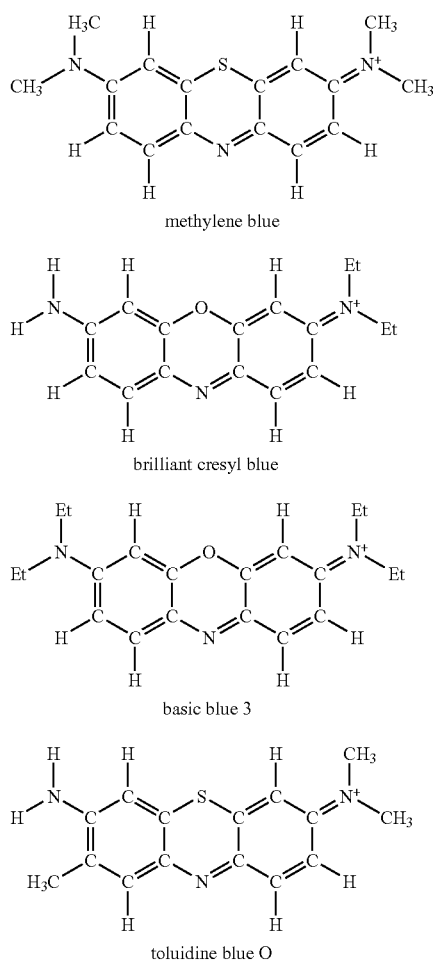

methylene blue VII brilliant cresyl blue VIII basic blue 3 IX toluidine blue O X The second substrate may be adapted to contain dyes to filter the light reaching the reactive layer. Photobleaching resistance may be improved by limiting the wavelengths of light that can be transmitted through the second substrate into the reactive layer. Suitable light filtration may be accomplished by incorporation of light absorbing compounds into the second substrate. Light absorbing compounds which may be employed for this purpose include anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bis-benzoxaxolylthiophenes (BBOT), napthalenetetracarboxylic derivatives, monoazo and disazo pigments, triarylmethanes, aminoketones, bis(styryl)biphenyl derivatives, and the like, as well as combinations thereof. The light absorbing compounds may be combined with oxygen scavenging additives. Oxygen scavenging additives effectively reduce oxygen permeability of the second substrate.

The amount of reactive material in the reactive layer may be adjusted depending upon the desired useable life of the data storage medium. In some embodiments the amount of reactive material in the reactive layer is as little as about 0.1 weight percent, with about 1 weight % preferred, based upon the total weight of the reactive layer; with an upper amount of reactive material being about 10 weight %, with about 7 weight % preferred, about 6 weight % more preferred, and about 5 weight % even more preferred.

In addition to the aforementioned oxygen-sensitive leuco dyes, numerous other dyes and light blocking materials can be synthesized and incorporated into the reactive layer to operate to limit the useful lifespan of the data storage medium. For example, other suitable reactive materials are disclosed in U.S. Pat. Nos. 4,404,257 and 5,815,484. The reactive material present in the reactive layer may in some embodiments of the present invention further comprise a mixture of two or more reactive materials, such as those illustrated herein.

In one embodiment of the present invention the reactive layer consists essentially of the reactive material that is preferably mixed with a carrier and deposited upon, impregnated into, or a combination of deposition on and impregnation into at least a portion of the surface of the reflective layer to form the reactive layer. Depending on the type of formulation the carrier is typically present in a range between about 65% and about 99.9%, and more typically present in a range between about 70% and about 80%, based upon the total weight of the formulation. When the reactive material is included in an adhesive formulation, the carrier is typically present in a range between about 90 to 99.9%, and more typically present in a range between about 95% and about 99.5% based on the total weight of the adhesive formulation. In one embodiment the carrier is a selected from a group consisting of thermoplastic acrylic polymers, polyester resins, epoxy resins, polythiolenes, UV curable organic resins, polyurethanes, thermosettable acrylic polymers, alkyds, vinyl resins and the like, as well as reaction products and combinations comprising at least one of the foregoing carriers. Polyesters include, for example, the reaction products of aliphatic dicarboxylic acids including, for example, fumaric or maleic acid with glycols, such as ethylene glycol, propylene glycol, neopentyl glycol, and the like, as well as reaction products and mixtures comprising at least one of the foregoing. In one embodiment the carrier of the reactive layer consists essentially of a UV curable organic resin. Suitable epoxy compounds which can be used to provide the carrier, include monomeric, dimeric, oligomeric, or polymeric epoxy material containing one or a plurality of epoxy functional groups. The carrier may comprise the reaction products of epoxy compounds such as bisphenol A diglycidyl ether. Also included as suitable carrier components are reaction products epoxy derivatives with phenol-formaldehyde resins, and the like. Other organic materials suitable for use as the carrier include mixtures of polyolefins and polythiols, such as shown by Kehr et al, U.S. Pat. Nos. 3,697,395 and 3,697,402. In one embodiment the carrier comprises a UV curable organic resin which provides a cross-linked acrylic resin upon irradiation. In yet another embodiment of the present invention the carrier is a thermoacrylic polymer. In another embodiment of the present invention the carrier comprises poly(methyl methacrylate). In yet another embodiment the reactive layer includes a carrier comprising poly(methyl methacrylate) and as the oxygen sensitive reactive material, leuco methylene blue. The thermoplastic acrylic polymers comprising the carrier typically have an inherent viscosity less than about 0.300 centimeters cubed per gram ($cm^3g^{-1}$) and more typically, less than about 0.250 $cm^3g^{-1}$, and most typically, less than about 0.200 $cm^3g^{-1}$.

In order to enhance adhesion of the reactive layer to the second substrate, a primer may be employed in-between the reactive layer and the second substrate. Thermoplastic acrylic polymers may serve as useful primers and include: acrylic homopolymers derived from a single type of acrylic acid ester monomer; methacrylic homopolymers derived from a single type of methacrylic acid ester monomer; copolymers derived from two or more different acrylic acid ester monomers, two or more different methacrylic acid ester monomers, or an acrylic acid ester monomer and a methacrylic acid ester monomer; and the like, as well as combinations comprising at least one of the foregoing primers. Mixtures of two or more of the aforementioned thermoplastic acrylic polymers, two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, and reaction products thereof, can also be used.

Optionally, the reactive layer can be applied to the substrate using various coating techniques such as painting, dipping, spraying, spin coating, screen printing, inkjet printing, and the like. In one embodiment, the reactive layer can be mixed with a relatively volatile solvent, preferably an organic solvent, which is substantially inert towards the polycarbonate, and will not attack and adversely affect the polycarbonate, but which is capable of dissolving the carrier. Generally the concentration of the carrier in the solvent is about 5 weight % or greater, with about 10 weight % or greater preferred, while the upper range of the polymer is about 25 weight %, with about 20 weight % or less preferred. Some suitable organic solvents include ethylene glycol diacetate, butoxyethanol, methoxypropanol, the lower alkanols, and the like. Generally, the concentration of the solvent in the coating solution is about 70 weight % or greater, with about 75 weight % or greater preferred, while the upper range of the polymer is about 90 weight %, with about 85 weight % or less preferred.

The reactive layer may also optionally contain various additives such as flatting agents, surface active agents, thixotropic agents, and the like, and reaction products and combinations of at least one of the foregoing additives.

The desired life of the data storage media depends on the rate at which the reactive material oxidizes to form the laser-light-absorbing dye. The oxidation rate in turn depends on the concentration of reactive material (eg. leuco dye) and oxygen in the reactive layer. The concentration of oxygen in the reactive layer as a function of time after the data storage media is exposed to air depends on the permeability of oxygen through the substrate and the presence or absence of oxygen scavengers.

For example, for the oxidation of leuco methylene blue (LMB) to methylene blue (MB), the rate of oxidation can be described by the following rate equation:

$$d[MB]/dt = k_{eff}[O_2][LMB] \qquad \text{(Eq. 2)}$$

where $k_{eff}$ is an effective rate coefficient which is dependant on several environmental and chemical factors including, but not limited to, temperature, pressure, acidity, and mobility of the reactants in the reactive-dye layer. The time required for oxygen to diffuse through the substrate can be approximated by Eq 1. Thus, the lower the diffusivity and permeability, the longer the diffusion lag time, and the greater the delay before the leuco dye begins to oxidize. The concentration of oxygen $[O_2]$ in the reactive layer can be related back to oxygen diffusivity by solving Fick's Second Law of Diffusion subject to the appropriate boundary conditions at each layer in the media (Crank, *The Mathematics of Diffusion*, $2^{nd}$ ed., Oxford University Press, 1975). The result for the concentration of oxygen, $[O_2]$, at the interface between the transparent substrate and the reactive layer for the case in which the reactive dye is in the adhesive is the following:

$$[O_2] = [O_2]_\infty erfc\ \{L/(4Dt)^{0.5}\} \qquad \text{(Eq. 3)}$$

where erfc is the complementary error function, L is the thickness of the substrate in units of cm, and t is time in units of sec. The diffusivity of oxygen, in units of $cm^2/s$, is assumed to be constant. The concentration of oxygen in the substrate at equilibrium, $[O_2]_\infty$, can be taken to be the solubility of oxygen in units of mole/L.

The thickness of the reactive layer is dependent upon the particular reactive material employed, the concentration thereof in the reactive layer, and the desired absorption characteristics of the layer both initially and after a desired period of time. When the reactive material is applied in a coating formulation, the reactive layer can have a thickness as low as about 1 micron (μ), with about 2μ preferred, and about 3μ more preferred. On the upper end, the thickness can be up to about 15μ or greater, with up to about 10μ preferred, and up to about 6μ more preferred. When the reactive material is applied in the adhesive, the reactive layer can be between 30 and 80 microns, and more preferably between 40 and 60 microns.

Once the desired lifespan of the limited play optical storage medium has been exceeded, the reactive layer should absorb a sufficient amount of incident light, reflected light, or combinations thereof at the wavelength of the laser in the given device to prevent the limited play optical storage medium from being read. In one embodiment of the present invention a layer that allows an initial percent reflectivity from the reflective layer of about 50% or greater can be employed, with an initial percent reflectivity of about 65% or greater preferred, and an initial percent reflectivity of about 75% or greater more preferred. Once the media has been exposed to oxygen, air, for a desired period of time that is the desired allowable play time of the media, the layer preferably comprises a percent reflectivity of about 45% or less, with about 30% or less preferred, about 20% or less more preferred, and about less than 10% especially preferred. The reactive material may be included in the storage medium as a coating formulation or can be included in an adhesive formulation. Examples of the reactive layer may include an oxygen sensitive dye in a PMMA coating adjacent to the reflective layer, or reactive dye in the adhesive layer between the second substrate and the reflective layer.

The amount of light measured at the optical head detector, $I_{initial}$, reflected from the metalized reflective layer for an uncoated disk or limited-play disk in which the reactive layer is still in the initial, non-light-absorbing state, can be related to the intensity of the laser light incident to the optical disk, $I_o$, by the following equation: $I_{initial}/I_o = R_{initial}$. The reflectivity factor $R_{initial}$ takes into account the inherent reflectivity of the reflective layer as well as any attenuation of the light intensity due to absorption and scattering in any of the layers at time t=0. At later times, after the reactive layer is exposed to oxygen, the dye absorbs light, reducing the intensity of light that is reflected back into the optical head detector. The light absorbance, A, in the reactive layer can be calculated using the Beer-Lambert Law:

$$A = -\log(I_t/I_o) = \epsilon c l \qquad \text{(Eq 4)}$$

where $I_i$ is the light incident to the reactive layer, $\epsilon$ is the molar extinction coefficient of the dye (about 54000 L/mole·cm$^{-1}$ for methylene blue at 650 nm), l is the thickness of the reactive layer, and c is the concentration of the dye which changes with time. Therefore, the reflectivity, R, for a limited-play disk with a light-absorbing reactive layer in which light is absorbed on both passes through the light-absorbing layer, can be approximated by the following relation:

$$R = I/I_o = R_{inital} 10^{(-2\epsilon c l)} \qquad \text{(Eq 5)}$$

Using equation 5, one can calculate the concentration of dye and reactive layer thickness necessary to achieve a specific reflectivity. For example, in the case in which the reactive layer thickness is 3 microns, the dye is methylene blue and is present in the reactive layer at a concentration of 0.027 mole/L, and the reflectivity of the disk is 70% without the light-absorbing dye, then the predicted reflectivity of the disk with the light-absorbing dye is 10%.

Data storage media can be produced by first forming the substrate material using a conventional reaction vessel capable of adequately mixing various precursors, such as a single or twin-screw extruder, kneader, blender, or the like. The extruder should be maintained at a sufficiently high temperature to melt the substrate material precursors without causing decomposition thereof. Similarly, the residence time in the extruder should be controlled to minimize decomposition. Residence times of up to about 2 minutes (min) or more can be employed, with up to about 1.5 min preferred, and up to about 1 min especially preferred. Prior to extrusion into the desired form (typically pellets, sheet, web, or the like), the mixture can optionally be filtered, such as by melt filtering, the use of a screen pack, or combinations thereof, or the like, to remove undesirable contaminants or decomposition products. Once the plastic composition has been produced, it can be formed into the substrate using various molding techniques, processing techniques, or combinations thereof. Possible techniques include injection molding, film casting, extrusion, press molding, blow molding, stamping, and the like. The substrate once produced, additional processing, such as electroplating, coating techniques like spin coating, spray coating, vapor deposition, screen printing, painting, dipping, and the like, lamination, sputtering, and the like, as well as combinations of at least one of the foregoing processing techniques, may be employed to dispose desired layers on the substrate. Typically the substrate has a thickness of up to about 600 microns.

In one embodiment the limited play optical data storage medium comprises an injection molded polymethacrylate first substrate. Various other layers that may be disposed on the first substrate include one or more data layers, dielectric layers, reactive layers, adhesive layers, reflective layers, protective layers, second substrate layers, light-absorbing layers.

Typically, the assembly of layers upon which the reactive layer is to be disposed is deaerated before application of the reactive layer. For example, an assembly upon which the reactive layer is to be disposed may consist of a molded first substrate, a data layer and a reflective layer. Typically deoxygenation is accomplished by applying the reactive layer to the assembly in an inert environment. Additionally, the reactants used to make the reactive layer are typically maintained in an inert environment. After the limited play optical storage medium has been produced it should be kept in an inert environment until ready for use. Typically, deoxygenation can be carried out with any inert gas, for example, nitrogen, argon, helium or carbon dioxide.

The limited play optical storage medium for data may comprise one or more protective layers, which protect against dust, oils, and other contaminants. The protective layer typically have a thickness in a range between about 10 Angstroms (Å) and about 100 microns (µ). A thickness of about 100 Å or less is especially preferred. The optimal thickness of the protective layer is usually determined, at least in part, by the type of read/write mechanism employed, e.g., magnetic, optic, or magneto-optic. Possible protective layers include anti-corrosive materials such as gold, silver, nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, and the like), among others, and combinations comprising at least one of the foregoing materials.

The limited play optical storage medium for data may comprise one or more dielectric layers, which are typically disposed on one or both sides of the data layer and are often employed as heat controllers. The dielectric layers typically have a thickness in a range between about 200 Å and about 1,000 Å. In some instances dielectric layers having a thickness of less than 200 Å may be preferred. Suitable materials for dielectric layers include nitrides (e.g., silicon nitride, aluminum nitride, and others); oxides (e.g., aluminum oxide); sulfides (e.g. zinc sulfide); carbides (e.g., silicon carbide); and combinations comprising at least one of the foregoing materials, among other materials compatible within the environment and preferably not reactive with the surrounding layers.

An adhesive layer may also be present which can adhere any combination of the above-mentioned layers. The adhesive layer can comprise any material which is capable of forming a layer penetrable by oxygen and which does not substantially interfere with the transfer of light through the media from and to the data retrieval device (e.g., that is substantially transparent at the wavelength of light utilized by the device, and/or which allows a reflectivity from the media of about 50% or greater, with a percent reflectivity of about 65% or greater preferred and a percent reflectivity of about 75% or greater more preferred). Optionally, the adhesive layer can be the reactive layer, ie. can contain the oxygen-sensitive dye. Possible adhesive materials include UV materials such as acrylates (e.g., cross-linked acrylates, and the like) silicon hardcoats, and the like, as well as reaction products and combinations comprising at least one of the foregoing materials. Other examples of UV materials are described in U.S. Pat. Nos. 4,179,548 and 4,491,508. Some useful monoacrylate monomers useful for the preparation of the adhesive used in the adhesive layer include butyl acrylate, hexyl acrylate, dodecyl acrylate and the like. Some useful polyfunctional acrylate monomers include, for example, diacrylates, triacrylates, tetraacrylates, and combinations thereof.

The adhesive layer may be derived from a single polyfunctional acrylate monomer, or a mixture of acrylate monomers. Typically the preferred adhesion layer compositions are found to be those which contain the UV light induced reaction products of a mixture of at least two polyfunctional acrylate monomers, preferably a diacrylate and a triacrylate. Monoacrylate monomers may, however, be preferred in particular instances. Optionally, the adhesive coating can comprise nonacrylic UV curable aliphatically unsaturated organic monomers in amounts up to about 50 weight % of the uncured adhesive coating that includes, for example, such materials as N-vinyl pyrrolidone, styrene, and the like, and reaction products and combinations comprising at least one of the foregoing materials.

When the adhesive layer comprises a mixture of acrylate monomers, it is preferred that the ratio, by weight, of the diacrylate to the triacrylate be in a range between about 10/90 and about 90/10. Exemplary mixtures of diacrylate and triacrylates include mixtures of hexanediol diacrylate with pentaerythritol triacrylate, hexanediol diacrylate with trimethylolpropane triacrylate, diethylene glycol diacrylate with pentaerythritol triacrylate, and diethylene glycol diacrylate with trimethylolpropane triacrylate, and the like.

The adhesive layer can also comprise a photosensitizing amount of photoinitiator, i.e., an amount effective to affect the photocure of the adhesive coating. Generally, this amount comprises about 0.01 weight %, with about 0.1 weight % preferred, up to about 10 weight %, with about 5 weight % preferred, based upon the total weight of the adhesive coating. Possible photoinitiators include blends of ketone-type and hindered amine-type materials that form suitable hard coatings upon exposure to UV radiation. It is preferable that the ratio, by weight, of the ketone compound to the hindered amine compound be in a range between about 80/20 and about 20/80. Typically, about 50/50 or about 60/40 mixtures are satisfactory.

Other possible ketone-type photoinitiators, which preferably are used in a nonoxidizing atmosphere, such as nitrogen, include: benzophenone, and other acetophenones, benzil, benzaldehyde and ortho-chlorobenzaldehyde, xanthone, thioxanthone, 2-chlorothioxanthone, 9,10-phenanthrenenquinone, 9,10-anthraquinone, methylbenzoin ether, ethylbenzoin ether, isopropyl benzoin ether, α,α-diethoxyacetophenone, α,α-dimethoxyacetophenone, 1-phenyl-1,2-propanediol-2-O-benzoyl oxime, α,α-dimethoxy-α-phenylacetopheone, phosphine oxides, and the like. Further included are reaction products and combinations comprising at least one of the foregoing photoinitiators.

The adhesive layer may also optionally comprise flattening agents, surface active agents, thixotropic agents, UV light stabilizers, UV absorbers and/or stabilizers such as resorcinol monobenzoate, 2-methyl resorcinol dibenzoate, and the like, as well as combinations and reaction products comprising at least one of the foregoing. The stabilizers can be present in an amount of about 0.1 weight %, preferably about 3 weight %, to about 15 weight %, based upon the weight of the uncured UV layer

EXAMPLES

The following examples are set forth to provide those of ordinary skill in the art with a detailed description of how the methods claimed herein are carried out and evaluated, and are not intended to limit the scope of what the inventors regard as their invention.

Method for Preparing Limited-Play DVDs Utilizing Reactive Layers

Comparative Example 1

A solution of PMMA in 1-methoxy-2-propanol was prepared by adding 60 grams of ELVACITE 2010 poly(methyl methacrylate) from Ineos Acrylics to 300 grams of 1-methoxy-2-propanol in a bottle and rolling on a roller mill to effect dissolution. The solution was transferred to a flask and heated to about 80° C. while a slow stream of nitrogen was passed over the surface of the solution. The de-aerated solution was transferred using nitrogen pressure to a de-aerated bottle closed with a rubber septum using a cannula tube.

A leuco methylene blue solution was prepared by combining 1.2 grams of methylene blue trihydrate and 0.80 grams of camphorsulfonic acid with 40 grams of 1-methoxy-2-propanol in a 100-mL flask equipped with a rubber septum. The stirred mixture was heated in a 90° C. water bath while a stream of nitrogen was passed into the flask using syringe needles for both the nitrogen inlet and for an outlet. While hot, 4.2 mL of Tin (II) 2-ethylhexanoate was added by syringe to reduce the methylene blue to the dark amber leuco methylene blue. To the solution was added 0.6 mL of flow additive BYK-301 from BYK Chemie. To make the PMMA/leuco methylene blue coating solution, the leuco methylene blue solution above was drawn into a syringe and then injected into the PMMA solution after having been passed through a 0.2-micron syringe filter.

Comparative Example 2

This comparative example illustrates the preparation of a prior art disk using a sandwich configuration. A solution was prepared as in Comparative Example 1 except the following quantitites of raw materials were used.

|  | | Weight (g) |
|---|---|---|
| PMMA Solution | | |
| DOWANOL PM [g] | | 67.1 |
| Total Elvacite [g] | | 15.2 |
| | Elvacite 2008: | 15.2 |
| | Elvacite 2010: | 0.0 |
| Dye Solution | | |
| Methylene blue trihydrate [g] | | 0.66 |
| Camphorsulfonic acid [g] | | 0.28 |
| DOWANOL PM [g] (5:1 ratio of DOWANOL to dye solution) | | 14.87 |
| Stannous chloride | | 2.85 |
| FLUORAD 50% solids FC-431 [ml] | | 0.15 |

The solution was used to apply a PMMA/leuco methylene blue basecoat to a 0.6 mm metalized BPA-polycarbonate DVD first substrate using a spin coater at 800 rpm for 60 seconds. The average coating thickness was found to be about 3 microns. After one of the discs with the PMMA/leuco methylene blue basecoat had been stored overnight in a nitrogen chamber, UV resin Daicure SD-640 was dispensed in a thin ring to the middle of the previously coated metalized DVD first substrate. Then, an unmetalized BPA-polycarbonate second substrate was placed on top of the first substrate disk with the ring of UV resin. The sandwich was spun at 1000 rpm for 10 seconds to disperse the UV adhesive evenly. The sandwich was then passed under a flash Xenon UV lamp for 25 seconds. The sandwich was then stored in a nitrogen chamber for at least 48 hours prior to exposure to air and reflectivity kinetics measurements.

Comparative Example 3

This Comparative Example illustrates the preparation of a limited-play disk of the present invention. A limited-play disk was prepared as described in Example 2. However, an unmetalized second substrate molded from BPA/DMBPC/DDDA terpolymer (molar ratio 49:49:2) was used instead of a BPA-PC substrate. The metalized first substrate was also molded from the BPA/DMBPC/DDDA terpolymer. The synthesis of the terpolycarbonate is described in U.S. Pat. No. 6,395,364.

Comparative Example 4

A limited-play disc was prepared as described in Comparative Example 2. However, an unmetalized second substrate molded from DMBPC homopolymer was used instead of a BPA-PC substrate. The metalized first substrate was molded from BPA/DMBPC/DDDA terpolymer.

Comparative Example 5

Limited-play discs were prepared as described in Comparative Example 2. However, unmetalized second substrates molded from blends of DMBPC-polycarbonate and BPA-polycarbonate were used instead of BPA-PC substrates. In one blend, the composition was 75 wt % DMBPC-polycarbonate and 25 wt % BPA-polycarbonate; in the other blend the composition was 50 wt % DMBPC-polycarbonate and 50 wt % BPA-polycarbonate. The metalized first substrate was molded from BPA/DMBPC/DDDA terpolymer.

Comparative Example 6

Limited-play discs were prepared as described in Example 2. However, unmetalized second substrates molded from blends of DMBPA-polycarbonate and BPA-polycarbonate were used instead of BPA-PC substrates. In one blend, the composition was 25 wt % DMBPA-polycarbonate and 75 wt % BPA-polycarbonate; in the other blend the composition was 50 wt % DMBPA-polycarbonate and 50 wt % BPA-polycarbonate. The metalized first substrate was molded from BPA/DMBPC/DDDA terpolymer.

Comparative Example 7

Limited-play discs were prepared as described in Comparative Example 2. However, unmetalized second substrates molded from PMMA (ACRYLITE DQ501, CYRO Industries) were used instead of BPA-PC substrates. The metalized first substrate was molded from BPA/DMBPC/DDDA terpolymer The coated discs from Comparative Examples 2–7 were allowed to stand under ambient conditions during which time the average % reflectivity was measured at intervals using a DR. SHENK PROmeteus instrument, model MT-136E. As the % reflectivity dropped, the color of the disc turned from essentially colorless to blue. The reflectivity time kinetics for the limited-play DVDs prepared using the sandwich configuration with the unmetalized substrates of various compositions (Comparative Examples 2–7) are shown in FIG. 1. The resulting reflectivity kinetics shown in FIG. 1 for this series illustrate that a range of failure times can be designed for the limited-play DVD using various compositions of unmetalized substrates. The failure time is shown to increase as a higher concentration of either DMBPC or DMBPA is present in the polycarbonate copolymers or blends. This is consistent with the lowered oxygen permeability of those materials relative to BPA-polycarbonate. Oxygen permeabilities of various polycarbonates and polymethacrylates are tabulated below in Table 1. FIG. 1 also shows that the reflectivity kinetics for the samples comprised of a PMMA homopolymer unmetalized disc are much slower than the samples comprised of the various polycarbonates. The failure time for the PMMA homopolymer sample was unacceptably long as it was still playable even after 2 weeks. This demonstrates the need for the compositions of the present invention with increased oxygen permeability relative to PMMA homopolymer.

Equations 2–5 above were solved simultaneously to predict the kinetics with which the reflectivities of limited-play DVDs decrease as the leuco dye in the reactive layer is oxidized. Parameters such as the initial concentration of leuco dye and the effective rate coefficient, $k_{eff}$, were used that best fit the reflectivity kinetics observed. An initial reflectivity, $R_o$, was assumed to be 65%. Boundary conditions were chosen to simulate conditions in which an infinitesimally-thin reactive layer is located between an unmetalized substrate and an adhesive layer. Under these circumstances, the concentration of oxygen in the reactive layer as oxygen diffuses through the unmetalized substrate can be predicted using equation 3. The time-dependence of reflectivity was calculated in a series of simulations in which the oxygen diffusivity in the substrate material was varied from $2\times10^{-8}$ cm$^2$/s to $1\times10^{-9}$ cm$^2$/s. A constant oxygen solubility of $6.69\times10^{-3}$ [cc]/([cc][cmHg]) was assumed, corresponding to a range of permeabilites from 1.35 Barrers to 0.067 Barrers, respectively. The resulting reflectivity kinetics for this series illustrated that a range of failure times can be designed for limited-play DVD's using compositions of unmetalized substrates with varying oxygen permeability.

Examples 1–10 and Comparative Examples 8–9

Films were prepared in order to compare the oxygen permeability of various polymethacryates with various polycarbonates. Approximately 2 grams of polymer were dissolved in 30 milliliters of methylene chloride. The solution was then filtered through a 0.45 micron syringe filter into a 14.3 centimeter diameter open glass ring sitting on a glass plate. The surface of the glass ring in contact with the plate was ground glass to prevent leakage of the polymer solution. A nitrogen atmosphere was maintained over the polymer solution to prevent moisture condensation in the methylene chloride solution during drying. After approximately 4 to 6 hours enough methylene chloride had evaporated to remove the glass ring and separate the film from the glass plate. The remaining methylene chloride was removed by placing the film in a heated vacuum oven for several hours. The thickness of the films were 70 to 100 microns and could be adjusted by modifying the amount of polymer in solution.

Film samples were mounted between two 10 cm×10 cm aluminum foil masks that had a circular 5 cm$^2$ die-cut opening and placed in the diffusion cell of a MOCON OX-TRAN 1000 instrument. After equilibrating in an oxygen atmosphere for 3–4 hours, the measurement of the oxygen transmission rate was begun by diversion of the test gas (nitrogen with 1% hydrogen) to the coulometric sensor. The measurement was continued until a steady-state oxygen transmission rate was reached, typically 12 to 24 hours.

TABLE 1

OXYGEN PERMEABILITIES AS MEASURED AT 25° C., 0% RELATIVE HUMIDITY.

| Example | Tradename | Composition | Film Thickness [mm] | OTR [cc/m2 · s] | Permeability [Barrers] |
|---|---|---|---|---|---|
| 1 | LEXAN OQ1030L | BPA-polycarbonate | 0.055 | 353 | 1.36 |
| 2 | | DMBPC-polycarbonate | 0.107 | 15.5 | 0.13 |
| 3 | | DMBPC-PC/BPA-PC 75/25 | 0.114 | 23.5 | 0.20 |
| 4 | | DMBPC/BPA/DDDA 49/49/2 | 0.094 | 42.3 | 0.30 |
| 5 | | DMBPA-PC/BPA-PC 50/50 | 0.064 | 177 | 0.85 |
| CE-8 | ELVACITE 2010 | PMMA | 0.10 | 10.3 | 0.078 |
| CE-9 | ACRYLITE DQ501 | PMMA | 0.074 | 12.5 | 0.070 |
| 6 | CYROLITE XT 8R6 | MMA/styrene/acrylonitiile terpolymer | 0.122 | 128 | 1.186 |
| 7 | CYROLITE XT EX375 | MMA/styrene/acrylonitrile terpolymer | 0.071 | 101 | 0.546 |
| 8 | CYROLITE G20-100 | MMA/styrene/ethyl acrylate terpolymer | 0.107 | 107 | 0.867 |
| 9 | CYROLITE G20-HF | MMA/styrene/ethyl acrylate terpolymer | 0.061 | 159 | 0.737 |
| 10 | | Poly(styrene-co-methylmethacrylate) | 0.097 | 274 | 0.404 |

The data in Table 1 illustrate that the PMMA copolymer compositions (Examples 6–9) are especially suitable for use in the limited play optical storage media of the present invention. The data further illustrate that while PMMA homopolymer is unsuited for use in the limited play optical storage media of the present invention, blends of PMMA homopolymer having the requisite oxygen permeability are achievable, for example a blend of 80 percent by weight MMA/styrene/acrylonitrile terpolymer with 20 percent by weight PMMA homopolymer.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A limited play optical storage medium for data, comprising:
    a) a first substrate;
    b) a reflective layer;
    c) a data layer disposed between said substrate and said reflective layer;
    d) a reactive layer comprising at least one carrier; and at least one reactive material; and
    e) an optically transparent second substrate with an oxygen permeability in a range between about 0.1 Barrers and about 1.35 Barrers at 25° C. wherein the reactive layer is disposed between the second substrate and the reflective layer, wherein the second substrate comprises a polymethacrylate copolymer, or a blend comprising a polymethacrylate homopolymer or copolymer.

2. The limited play optical storage medium in accordance with claim 1, wherein the second substrate has a glass transition temperature of at least about 100° C.

3. The limited play optical storage medium in accordance with claim 2, wherein the second substrate comprises structural units corresponding to structure (I):

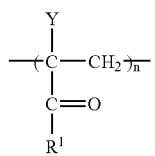

I wherein Y is hydrogen, a $C_1$–$C_{12}$ alkyl group, a $C_4$–$C_{10}$ aryl group, $R^1$ is $C_1$–$C_{12}$ alkoxy group, and n is an integer from 1 to 10000.

4. The limited play optical storage medium in accordance with claim 3, wherein the second substrate comprises structural units corresponding to structure II

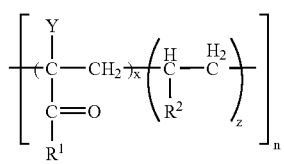

II wherein Y is hydrogen, a $C_1$–$C_{12}$ alkyl group, a $C_4$–$C_{10}$ aryl group; $R^1$ is $C_1$–$C_{12}$ alkoxy group; $R^2$ is $C_4$–$C_{10}$ aryl group, $C_1$–$C_{12}$ alkoxy group, cyano, nitro, or halogen; x and z are independently integers from 1–10000; and n is an integer from 1 to 10000.

5. The limited play optical storage medium in accordance with claim 1, wherein said first substrate is a thermoplastic.

6. The limited play optical storage medium in accordance with claim 5, wherein said thermoplastic has a glass transition temperature of at least 100° C.

7. The limited play optical storage medium in accordance with claim 6, wherein said thermoplastic is selected from the group consisting of polyvinyl chloride, polyolefins, polyesters, polyamides, polysulfones, polyimides, polyetherimides, polyether sulfones, polyphenylene sulfides, polyether ketones, polyether ether ketones, ABS resins, polystyrenes, polybutadiene, polyacrylates, polymethacrylates, polyacrylonitrile, polyacetals, polycarbonates, polyphenylene ethers, ethylene-vinyl acetate copolymers, polyvinyl acetate, liquid crystal polymers, ethylene-tetrafluoroethylene copolymers, aromatic polyesters, polyvinyl fluoride, polyvinylidene fluoride, polyvinylidene chloride, tetrafluoroethylene, and mixtures, copolymers, reaction products, and composites comprising at least one of the foregoing thermoplastics.

8. The limited play optical storage medium in accordance with claim 7, wherein said thermoplastic comprises polycarbonate.

9. The limited play optical storage medium in accordance with claim 1, wherein the reflective layer comprises a metal.

10. The limited play optical storage medium in accordance with claim 9, wherein the metal comprises aluminum, silver, gold, titanium, alloys, or combinations thereof.

11. The limited play optical storage medium in accordance with claim 1 wherein said data layer is embossed upon a surface of said first substrate.

12. The limited play optical storage medium in accordance with claim 11 wherein said data layer comprises pits and land.

13. The limited play optical storage medium in accordance with claim 1, wherein said reactive material is an oxygen sensitive dye.

14. The limited play optical storage medium in accordance with claim 13, wherein said oxygen sensitive dye is selected from the group consisting of leuco methylene blue, reduced forms of methylene blue, brilliant cresyl blue, basic blue 3, and toluidine 0.

15. The limited play optical storage medium in accordance with claim 13 wherein the oxygen sensitive dye is leuco methylene blue.

16. The limited play optical storage medium in accordance with claim 15, wherein said carrier comprises polymethylmethacrylate.

17. The limited play optical storage medium in accordance with claim 1, wherein said carrier is at least one material selected from the group consisting of thermoplastic acrylic polymers, polyester resins, epoxy resins, polythiolenes, UV curable organic resins, polyurethanes, thermosettable acrylic polymers, alkyds, vinyl resins, and reaction products thereof.

18. The limited play optical storage medium in accordance with claim 16, wherein said carrier comprises a thermoplastic acrylic polymer.

19. The limited play optical storage medium in accordance with claim 1, wherein said reactive layer comprises polymethylmethacrylate and leuco methylene blue.

20. The limited play optical storage medium in accordance with claim 1, wherein said reactive layer comprises a UV curable organic resin.

21. The limited play optical storage medium in accordance with claim 20, wherein the UV curable organic resin comprises cross-linked acrylic resins.

22. The limited play optical storage medium in accordance with claim 1, wherein the second substrate further comprises an additive wherein the additive substantially increases the oxygen permeability of the second substrate.

23. The limited play optical storage medium in accordance with claim 22, wherein the additive comprises at least one member of the group consisting of antiplasticizers, pigments, mold release agents, thermal stabilizers, ultraviolet absorbers, and oxygen scavengers.

24. A limited play optical storage medium for data, comprising:
   a. a first substrate;
   b. a reflective layer;
   c. a data layer disposed between said substrate and said reflective layer;
   d. a reactive layer comprising at least one carrier; and at least one reactive material; and
   e. an optically transparent second substrate comprising an olefin polymer selected from the group consisting of methyl methacrylate-styrene-acrylonitrile terpolymers, and methyl methacrylate-stryrene-ethyl acrylate terpolymers, said olefin polymer having an oxygen permeability in a range between about 0.2 Barrers and about 1.2 Barrers at 25° C., wherein the reactive layer is disposed between the second substrate and the reflective layer.

25. A limited play optical storage medium for data, comprising:
   a. a first substrate consisting essentially of polycarbonate, said polycarbonate having a Tg greater than about 100° C.;
   b. a reflective layer consisting essentially of aluminum;
   c. a data layer disposed between said substrate and said reflective layer, said data layer comprising pits and land embossed upon a surface of said polycarbonate;
   d. a reactive layer comprising poly(methyl methacrylate) and leuco methylene blue;
   e. an optically transparent second substrate comprising an olefin polymer selected from the group consisting of methyl methacrylate-styrene-acrylonitrile terpolymers, and methyl methacrylate-stryrene-ethyl acrylate terpolymers, said olefin polymer having an oxygen permeability in a range between about 0.2 Barrers and about 1.2 Barrers at 25° C., wherein the reactive layer is disposed between the second substrate and the reflective layer.

* * * * *